A. J. BOWIE, Jr.
ELECTRIC ENERGY CONVERTER AND METER.
APPLICATION FILED MAR. 12, 1914.

1,287,851. Patented Dec. 17, 1918.

WITNESSES:
Nathan Moran
Thomas H. Laine

INVENTOR
Augustus Jesse Bowie Jr

UNITED STATES PATENT OFFICE.

AUGUSTUS JESSE BOWIE, JR., OF SAN FRANCISCO, CALIFORNIA.

ELECTRIC-ENERGY CONVERTER AND METER.

1,287,851.  Specification of Letters Patent.  Patented Dec. 17, 1918.

Application filed March 12, 1914. Serial No. 824,181.

*To all whom it may concern:*

Be it known that I, AUGUSTUS J. BOWIE, Jr., a citizen of the United States, residing at San Francisco, county of San Francisco, and State of California, have invented certain new and useful Improvements in Electric-Energy Converters and Meters; and I do hereby declare the following to be a full, clear, and exact description of the invention, such as will enable others skilled in the art to which it appertains to make and use the same.

It is the object of this invention to provide means for deriving power from and for effecting the indication of or recording of the current, voltage or power in high tension lines. According to present practice, series transformers are commonly employed for the purpose of operating meters for indicating the current in high tension lines.

As it is generally desirable to locate indicating means in a position where it will not require material insulation from the ground and hence will be safe to handle, these series transformers are generally insulated between the primary and secondary for the full potential. This construction renders the cost of transformers very high and it is the object of my invention to provide a device which will perform the same functions as are now performed by series transformers at a greatly lowered cost.

Series transformers for high tension lines are in general employed not only for indicating current in the line but also for operation of automatic over-load circuit breakers which will open the circuit after the current gets to a pre-determined value. Series transformers may be also employed as a source of derivation of power, though this use is rather exceptional as it is generally preferable to employ shunt transformers for this purpose. My invention will perform the same function of allowing the derivation of power from a high pressure circuit without the expense of series transformers. The principal application, however, of the invention is to take the place of the series transformer for the purposes of measuring the line current and for the operation of devices such as over-load circuit breakers, dependent for their operation on the current values.

The invention in general consists of an actuating device, substantially in contact with the line deriving power from the current flowing in the line (in other words, of the series type), this actuating device in turn transmitting the power or indication through an insulating means to a secondary device either utilizing or indicating or recording the power transmitted and utilized or measured. The insulating means just mentioned is sufficient in general to insulate the high tension line for the full line potential, from the receiving device. The actuating device may consist for example of a coil of wire in the form of a solenoid or of an electric motor or similar device, adapted for driving any of the well-known form of power apparatus, such as a pump or fan or shaft. The coil or the motor may be connected directly in series with the line, or may be connected as a shunt across the terminals of a resistance or a reactance which is in series with the line or may be actuated by a series transformer, the primary of which is in series with the line. If a transformer of this type is employed, the cost of the same will be relatively low, as a very slight insulation between primary and secondary will suffice. The insulating means for transmitting power from the actuating means may consist of either a solid or a fluid. One of the methods of this invention is the use of a fluid for the insulating means, said fluid in general being confined in an insulating tube. The use of a fluid for the purpose has many important advantages in economy, simplicity and certainty of operation. The driven means to which power is transmitted through the insulating means may be made in a great variety of forms, and may consist of any of the well-known devices for receiving, measuring or transmitting power. For example, it may consist of a spring which will by its indication weigh the power transmitted or it may consist of a pressure gage in event of transmission of power through fluid insulating means, or it may consist of any type of power apparatus such as pump, generator, etc., adapted to be driven from the power transmitted through said insulating means. The indications of said receiving means or results derived from said means or from measurement thereof may be utilized for the operation of any device such as an automatic circuit breaker.

For specific type and application of preferred form of this invention, I have shown the application to automatic over-load circuit breakers as illustrated in the drawings. The general function of automatic over-load circuit breakers consists primarily in a switch for closing the circuit, said switch being provided with a latch for holding it in the closed position and a spring which tends to open it when said latch is released. This latch is in turn actuated by over-load in any one of the lines passing through said switch. These lines, however, must be insulated from the releasing latch which is substantially grounded, for the full potential of the line. Therefore, the effect of the overload current in the lines must be transmitted to said latch through suitable insulating means. It is common practice in high tension circuits to perform this action by means of series transformers inserted in the high tension line, the secondaries thereof being insulated from the primaries for the full line potential. The current through the secondaries is then in turn taken to small trip magnets which effect either directly or through relay the release of the main trigger. With my device, however, the action effecting this release is transmitted from the high tension line to the latch mechanically through the insulating means which in general operates some form of relay.

The insulating means which I prefer consists of a fluid preferably confined in pipes. The action of said fluid for transmission of the power to the operating device is governed by the current which exists in the main conductor. One type of mechanism consists of a small motor in series with the high tension line direct connected to a centrifugal fan. The speed of the motor is dependent upon the line current and as the pressure generated by the fan is also dependent on the speed of the motor, the air pressure will in turn be dependent on the line current and if this pressure is transmitted through an insulated tube to a suitable diaphragm, this may in turn be made to actuate the release trigger of the breaker. In general, the breakers will control two or three lines and in this event the pressure generated by one fan would blow out through the other fans, in event of the over-load occurring on only one line. To obviate this difficulty, the pipes leading to the individual breakers may be provided with check valves which allow the air to flow in only one direction. This is illustrated in Figure 1, which shows diagrammatically the arrangement of the two pole breaker of type mentioned. A corresponding arrangement may be made for three pole work.

Figure 1:
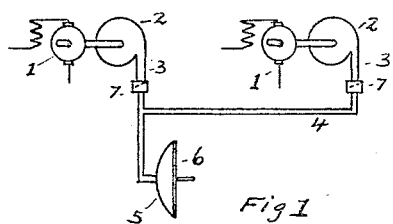
Fig. 1 illustrates diagrammatically the operation of two series motor driven fans for operating an overload trip for circuit breaker.

In Fig. 1, 1 1 are motors connected directly in series with the two lines of a 2-wire transmission. These motors drive in turn fans 2, 2 which discharge the air through pipes 3, 3 into a tube 4, connected with a chamber 5, containing a diaphragm 6. 7, 7 are check valves which allow the air from the fans to pass in only one direction. When the air pressure in any one line becomes sufficiently great, the diaphragm 6 will move outward and communicate motion to some type of release trip for opening the circuit.

Figure 2:
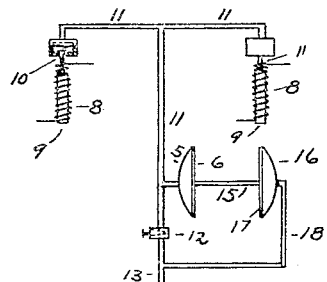
Fig. 2 shows two circuit line with magnets controlling the relief valve of the air pressure system for automatically opening the circuit.

Fig. 2 shows another method of control for 2-wire line, in which 8, 8 are magnet coils in series with the line. These coils contain plungers 9, 9 having at their upper ends valves 10, 10 which form an outlet for pipes 11. Connected to pipe 11 is chamber 5 and diaphragm 6. 12 is a needle valve and 13 is a pipe connecting with a reservoir 14 which is supplied with air under pressure. The diaphragm 6 has a spindle 15 communicating with a trip mechanism for opening the circuit breaker, the arrangement being such that when the pressure in the tube 11 is sufficiently reduced, the diaphragm 6 will be pushed inward and this action will release the breaker. The valves 10, 10 will normally remain closed but if the current in any line exceeds a pre-determined value it will lift the corresponding plunger 9 and in turn will open the valve connected thereto. This valve allows a relatively large opening in the pipe system 11, the opening being very much greater than that provided by the valve 12. As a result, the air pressure in 11 will be greatly reduced, pushing inward the diaphragm 6 and tripping the breaker. There will be a certain time elapsed between the opening of the valve and the lowering of the pressure in the pipe system 11 and by suitable adjustments of the needle valve 12 this may be taken advantage of to provide a time element in the operation of the circuit breaker. To provide against the opening of the breaker in event of loss of pressure for any reason in the tank 14 an auxiliary chamber 16 provided with a diaphragm 17 connected in turn to spindle 15 is used. Pipe 18 makes connection between the chamber 16 and the pipe 13.

With the arrangement shown then the action of the trip mechanism is dependent upon a difference of pressure between the pipe 13 and the pipe 11 and in event of a leakage and consequent loss, of the pressure in tank 14, the breaker would not trip. In the normal action of the breaker when the circuit was opened the coils 8 would be deenergized and the cores 9 with valves 10 would return to the closed position. If desired the chamber 16, diaphragm 17, and pipe 18 may be omitted, the branch opening from 13 to 18 being also omitted.

Figure 3:
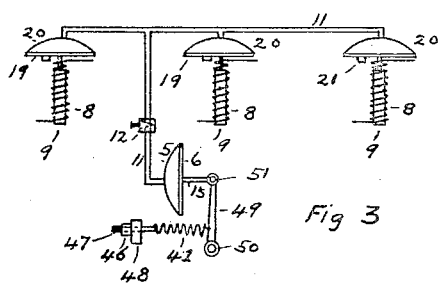
Fig. 3 shows arrangement of three magnet coils for compressing diaphragms for opening circuit from overload.

Fig. 3 shows a preferred form of arrangement for operating the breaker showing arrangement for 3-phase circuit. The coils 8 are connected in series with the respective lines and control the operation of magnet cores 9. When these cores are drawn upward the upper end of the plunger 9 will strike against a diapragm 19, held in a case, 20. In the open position of the breaker, the diaphragm 19 rests against a stop 21. The cases 20 are connected together by pipe system 11 which connects in turn to a chamber 5 and diaphragm 6, connecting through spindle 15 to the trip latch of the breaker. The diaphragms and pipe system are completely filled with a liquid such as oil, all air being excluded.

Fig. 3 also shows a very desirable method of adjustment of the breaker, wherein a single adjustment may be used for all poles of the breaker. The tension of the spring 41, one end of which is attached to lever 49, and the other end to screw 47, may be altered by the nut 46 which operates on the screw 47, which is supported in the support 48. By adjustment of the nut 46, the point of trip of the breaker may be altered so that the breaker will operate at any desired current, the condition of operation being determined by the maximum pressure of any of the plungers 9, against the diaphragms 19. Thus the adjusting apparatus may be located on the grounded side of the system, and a single adjusting apparatus will adjust all poles of the breaker.

In event of difference of level between the cases 20 and chamber 5 when a liquid is employed in the pipe system or for other purposes deemed desirable, the spring 41 may be provided to effect adjustment of the apparatus, same being attached to lever 49, pivoted on pivot 50. Spindle 15 is attached to lever 49 by pin 51. In event of over-load, the plunger 9 will strike the diaphragm 19 and depress it. This in turn communicates motion to the diaphragm 6 and will trip the breaker. Pipes 11 are in part insulating pipes, preferably with a comparatively small hole, in order to provide a minimum oil storage in the system. A needle valve 12 may be used to effect a time element.

Figure 4:
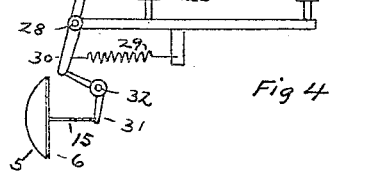
Fig. 4 shows detail of arrangement of trip for opening the circuit, together with switch blade.

Fig. 4 shows diagrammatically the principle of operation of the breaker. 22, 23 are terminals connected together through the blade 24, which closes the circuit. This blade is pivoted on an insulator cap 25 and is operated through the link 26, operated in turn by an insulator 27, mounted on insulator pin 30 pivoted on pivot 28. The spring 29 connected to the insulator pin 30 of insulator 27 always tends to open the breaker. The breaker, however, is held in closed position by a bell-crank lever 31 pivoted on a pivot 32, said lever being connected by the rod 15 to diaphragm 6 mounted in chamber 5. When this diaphragm is pressed outward, the lever is rotated and releases the pin 30 and allows the breaker to open.

Figure 5:
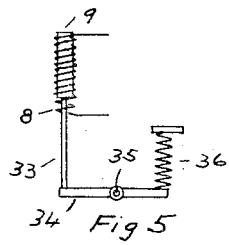
Fig. 5 shows mechanism for indicating current in primary line.

Fig. 5 shows the application of the invention to mechanism for indicating the current in the primary line. 8 is a magnet coil in series with a line and 9 is its core. This is connected through an insulated rod 33 to a lever 34, pivoted on pivot 35, to which is connected a measuring spring 36. The pull of the coil 8 on the core 9 may thus in turn be weighed by suitable indicator attached to spring 36, which may by calibration be made to indicate the current flowing in the line connected through 8.

Figure 6:
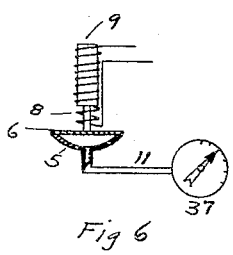
Fig. 6 shows mechanism for indicating current through liquid pressure.

Fig. 6 is a preferred type of current indicator, wherein 8 is a magnet coil with core 9 pressing in turn on the diaphragm 6 contained in the casing 5. Connected with the casing 5 is an insulating pipe 11 attached to the other end of which is a pressure gage 37. The chamber 5 and pipe 11 are filled with an insulating fluid, oil for example, and hence the pressure of core 9 on diaphragm 6 is in turn measured by the gage needle. If desired, this gage needle may be made to operate the latch of a circuit breaker by suitable relay contact. The gage may be calibrated to read directly the current flowing in the main circuit.

Figure 7:
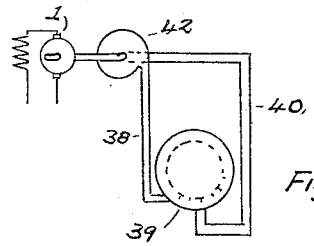
Fig. 7 shows diagrammatic method of obtaining power from high tension line.

Fig. 7 illustrates diagrammatically another type of device for obtaining power from the high tension circuit, wherein a series motor 1 drives pump 42 which actuates through the pipe 38 an impulse wheel 39. 40 is a suction pipe from which liquid handled by the pump is returned to the pump. Thus, for example, the pump 42 will deliver liquid under pressure to pipe 38 which in turn operates the wheel 39. 38 and 40 are insulating tubes and the liquid is also an insulating liquid.

Figure 8:
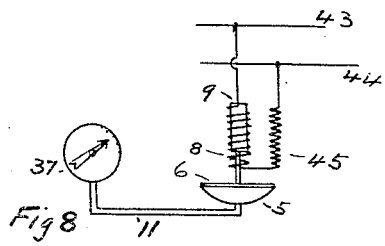
Fig. 8 shows method of indicating voltage through liquid pressure.

The invention as herein described shows application to series current. However, the same invention may be applied to shunt conditions. For instance, in case it is desired to obtain a meter to measure the voltage without the expense of a shunt transformer, a magnet coil may be connected in series with resistance, across the lines and the plunger of said coil may be used to transmit fluid pressure to the pressure gage, which will then become a volt meter. This is illustrated in Fig. 8 in which 43 and 44 are two lines in the high tension system, between which is connected a magnet coil 8, in series with the resistance 45. If desired, an inductance or capacity may be used in place of the resistance. The current through the coil will be dependent upon the voltage and will make a corresponding pressure on the core 9, which in turn will press on the diaphragm 6 contained in the casing 5 and will transmit fluid pressure through insulating tube 11 to the pressure gage 37, which by suitable calibration will then become a volt meter. The action of the voltage may be thus taken advantage of to operate the latch of a circuit breaker dependent upon its operation upon voltage conditions. For example, the breaker may be provided with a no-voltage trip, which will open the circuit when the voltage goes off. The gage for measuring current and voltage may be made recording by the use of suitable chart driven by clock-work, in a manner common to other types of recording apparatus or else other means may be used to accomplish this same result.

What I claim is:

1. In an automatic circuit breaker, apparatus energized from the current flowing in an electric line, fluid insulating means in an insulating conduit adapted to transmit power from said apparatus, in combination with receiving means adapted to receive said power from said insulating means and to actuate thereby the release of said circuit breaker and to allow it to open when the current in said electric line through said breaker exceeds a pre-determined value.

2. In an automatic circuit breaker, apparatus energized from the current flowing in an electric line, a diaphragm actuated by said apparatus, a chamber containing said diaphragm and communicating through an insulating conduit containing an insulating fluid, with another chamber and diaphragm adapted to be operated by said fluid, in combination with means for causing said circuit breaker to open when the current in said line exceeds a pre-determined value, said means being controlled through the second diaphragm.

3. In an automatic circuit breaker, apparatus energized from an electric line, fluid insulating means in an insulating conduit adapted to transmit power from said apparatus, receiving means adapted to receive power from said insulating means and to actuate thereby the release of said circuit breaker, in combination with adjustable means attached to the receiving means to control the point of release of said circuit breaker when the current in any electric line through said circuit breaker exceeds a pre-determined value.

4. In an electric energy converter, a motor energized by current flowing in an electric line, in combination with an insulating fluid and apparatus driven by said motor adapted to cause pressure differences in said insulating fluid, and of a receiving apparatus adapted to be operated through the power transmitted thereto from said motor through said fluid.

In testimony whereof I affix my signature in the presence of two witnesses.

AUGUSTUS JESSE BOWIE, Jr.

Witnesses:
J. F. BOWIE,
ALICE SPENCER.

Copies of this patent may be obtained for five cents each, by addressing the "Commissioner of Patents, Washington, D. C."